United States Patent [19]

Zur

[11] 4,078,842
[45] Mar. 14, 1978

[54] KIT FOR INFLATABLE FULL LENGTH BODY SUPPORTING SEAT

[76] Inventor: Henry Chanoch Zur, 10 W. Griswold, Phoenix, Ariz. 85021

[21] Appl. No.: 685,759

[22] Filed: May 13, 1976

[51] Int. Cl.² ............................................. A47C 31/10
[52] U.S. Cl. .................................. 297/229; 297/284; 297/DIG. 3
[58] Field of Search ................. 297/219, DIG. 3, 284, 297/229; 5/369, 368

[56] References Cited

U.S. PATENT DOCUMENTS

| | | | |
|---|---|---|---|
| 1,608,239 | 11/1926 | Rosett | 5/369 X |
| 2,086,640 | 7/1937 | Reynolds | 297/229 X |
| 2,938,570 | 5/1960 | Flajole | 297/DIG. 3 |
| 3,099,483 | 7/1963 | Hofberg | 297/219 |
| 3,330,598 | 7/1967 | Whiteside | 297/DIG. 3 |
| 3,363,941 | 1/1968 | Wierwille | 5/369 X |
| 3,605,138 | 9/1971 | Tucker | 5/369 X |
| 3,661,442 | 5/1972 | Sember | 297/284 |
| 3,867,732 | 2/1975 | Morrell | 297/DIG. 3 |

Primary Examiner—Francis K. Zugel

[57] ABSTRACT

A kit including the elements necessary to adapt a seat and a conventional vehicle seat in particular to provide full length body support and inflatable adjustment of its various portions to suit the size and the comfort of a particular occupant of the seat. The kit comprises a plurality of inflatable bags attached together in mattress like form with each bag having a port through which air may be introduced under pressure into the bag or exhausted therefrom; and a slip cover dimensioned to fit over the air bags and a car seat when applied thereto with the seat cover including means for securing it in position on the car seat.

4 Claims, 7 Drawing Figures

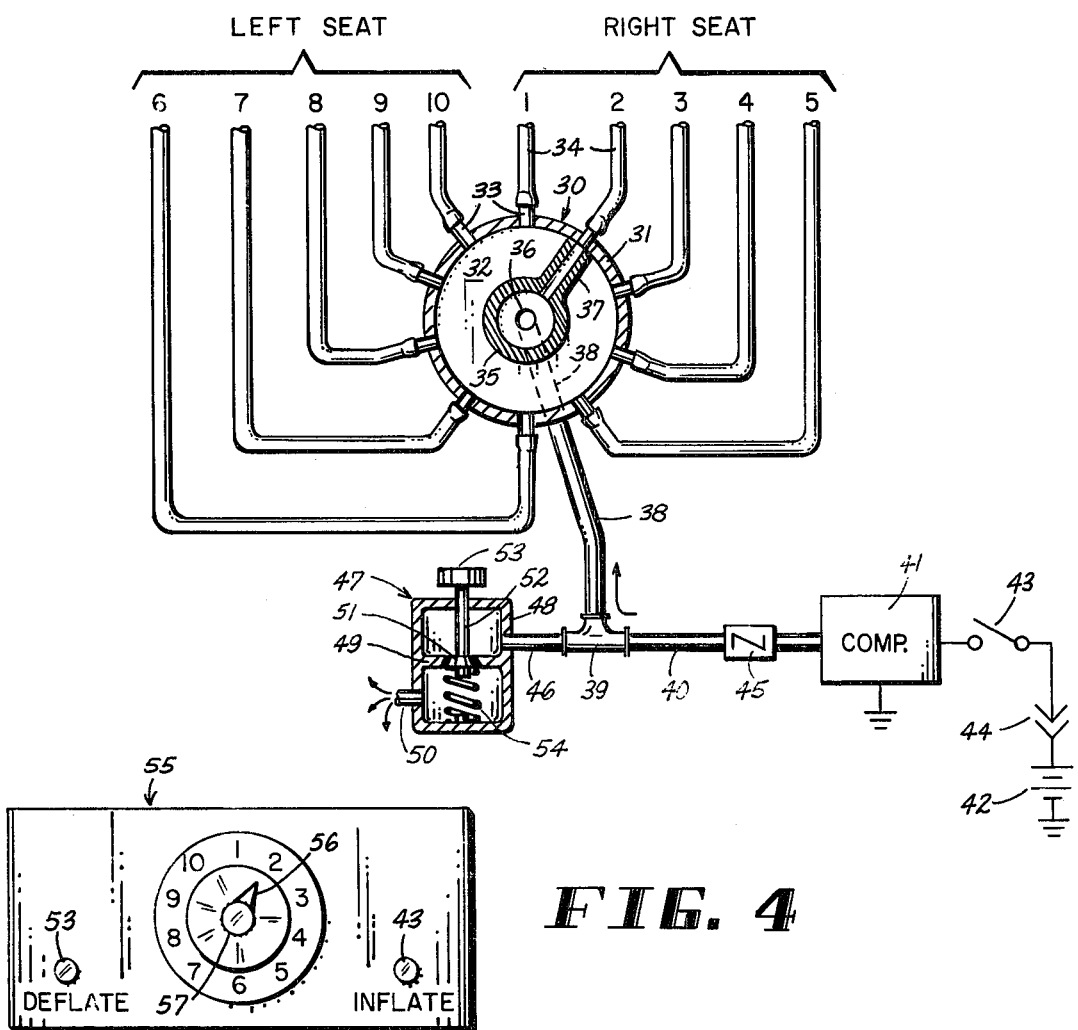
FIG. 3
FIG. 4
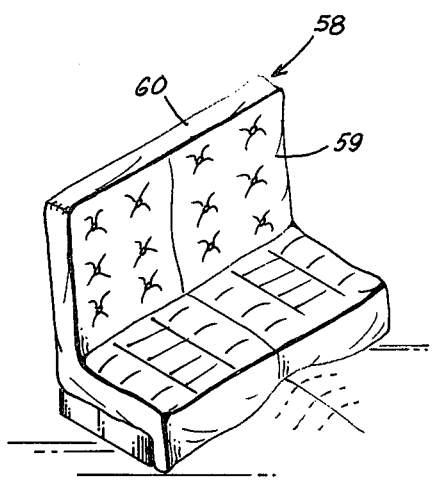
FIG. 5

KIT FOR INFLATABLE FULL LENGTH BODY SUPPORTING SEAT

The present invention relates to car seats which include inflatable air bags which may be adjusted to accommodate a particular occupant and is concerned primarily with a kit which includes elements which may be added to a conventional car seat to convert it to one which may be adjusted to suit the comfort of a particular occupant.

BACKGROUND OF THE INVENTION

The broad idea of providing a seat for a conventional automobile which may be adjusted to suit the comfort of a particular occupant has prompted many an effort along the lines of building into such a seat a plurality of inflatable bags together with mechanism for charging air under pressure selectively into the bags and exhausting air therefrom. This engineering and research work has resulted in many car seats of the type aforesaid however, they may all be characterized as being specially built seats which are either installed by the car manufacturer or applied to a conventional seat only with extensive alteration of the latter and at considerable expense.

The present invention is founded on the basic concept of providing a kit which may be purchased by a car owner as a kit and which includes the elements and devices which may be added to a car seat and the automobile in which the seat is installed with a minimum of inconvenience and without any appreciable alteration of the car seat.

OBJECTS OF THE INVENTION

With the foregoing conditions in mind, the present invention has in view the following objectives;

1. To provide a kit for making a seat full length body supporting and adaptable for size and comfort by including a succession of inflatable air bags the pressure of which may be adjusted to accommodate a particular occupant.

2. To provide, in a kit of the character aforesaid, an assembly of a plurality of inflatable air bags which are assembled in mattress like form and each of which includes a port through which air under pressure may be introduced into the bag or exhausted therefrom.

3. To provide, in a kit of the type noted, a cover shaped and dimensioned to hold on to a seat an the assembly of air bags positioned thereon and which secures the air bags in position.

4. To provide, in a kit of the kind described, a source of air under pressure such as a compressor, a selector valve communicating with said source of air under pressure and a system of conduits which extend from the selector valve to the individual air bags and which conduit system also includes an exhaust valve which may be connected to a port of any of the bags and which is operable to exhaust air from the bag to which it is connected as occasion demands.

5. To provide, in a kit of the type noted, mechanism which is associated with the slip cover to secure the slip cover to the car seat.

6. To provide in a kit of the type noted a simplyfied control panel with a selector valve directing the fluid to and from the inflatable bags of one ore more seats, and 2 buttons, one activating the inflow, and one activating the outflow of fluid into or from a selected bag.

Various other more detailed objects and advantages of the invention, such as arise in connection with carrying out the above ideas in a practical embodiment will, in part, become apparent and, in part, be hereinafter stated as the description of the invention proceeds.

SUMMARY OF THE INVENTION

Since the main object of the invention is to provide a kit for making a seat full length body supporting and adjustable generally, and vehicle seats in particular, for better understanding seats were mainly described as car seats, covering as slip cover, and fluid as air. These descriptions were made by way of example and not of limitation.

The foregoing objects are achieved by providing a conversion kit for a car seat which in its simplest embodiment comprises a plurality of inflatable air bags which are assembled in mattress like form and which are designed and dimensioned to overlay the back of the car seat including the head rest, the body supporting horizontal seat portion of the car seat, and the leg engaging portion of the car seat. Each of these bags is provided with a port from which a coupling element such as a nipple extends and through which air under pressure is introduced into the bag or exhausted therefrom.

A slip cover is dimensioned and designed to fit over the air bag assembly on the car seat in a manner sufficiently snug to retain the air bag assembly in effective position. A portion of the slip cover has front, rear, and side panels which fit over the back of the car seat with the air bags in position thereagainst and a seat portion that fits over the air bags on the seat proper, and side panels extending downwardly over the outer sides of the seat proper and may be tucked in beneath the seat proper or attached thereto in any appropriate manner. To facilitate application of the seat cover to the car seat with the air bags thereon, the side panels of the slip cover are formed with a slit which may be closed to any required extent by the well known slide fastener which is commonly known as a zipper.

The kit also includes an appropriate source of air under pressure such as a compressor which may be driven by a small horsepower motor energized by the car battery. A conduit extends from the compressor to a T fitting and included in this conduit is a one-way check valve. Also connected to the T fitting at the side opposite to the compressor is a normally closed exhaust valve which is biased into closed position by a spring but which may be moved into an open position by a manually depressable button.

Extending from the stem of the T fitting is a tube which is connected to a selector valve. This valve comprises a cylindrical casing having a plurality of ports therein corresponding in number to the number of air bag ports. Each of the ports in the selector valve is connected to one of the air bag ports by a tube which is preferably flexible. Also included as a part of the selector valve is an axial tube which is rotatably mounted within the casing. This tube has a central bore which communicates with the tube extending from the T fitting. It also carries a radial tubular extension which may be moved into a position connecting any one of the casing ports with the bore of the tube. The tube is provided with a manually operable knob together with a pointer which indicates which casing port is connected to the bore of the tube. A manually operable on-off switch is also provided for the compressor.

In operation, when the air pressure in a particular air bag is to be changed the axial tube is rotated to connect the particular port for that bag to the casing port. If air pressure is to be increased the motor which operates the compressor is energized and air under pressure flows from the compressor through the one-way check valve adjacent thereto, the T fitting, the conduit to the axial tube, and from the bore of the tube through the radial extension to the port with which the radial extension aligns. During such action the exhaust valve remains closed under the spring bias. If air pressure is to be relieved the exhaust valve is opened by depressing the button and air will be exhausted from the air bag through the selector valve and T fitting.

For a full and more complete understanding of the invention, reference may be had to the following description and accompanying drawings wherein:

FIG. 3 is a diagrammatic view illustrating the selector valve, conduit system, compressor and exhaust valve for the two seats illustrated in FIG. 1.

FIG. 4 is a front elevation of the selector valve.

FIG. 5 is a perspective of the rear seat of a conventional automobile which is ordinarily designed for occupancy by two people.

DESCRIPTION OF A PREFERRED EMBODIMENT

Figure 1:
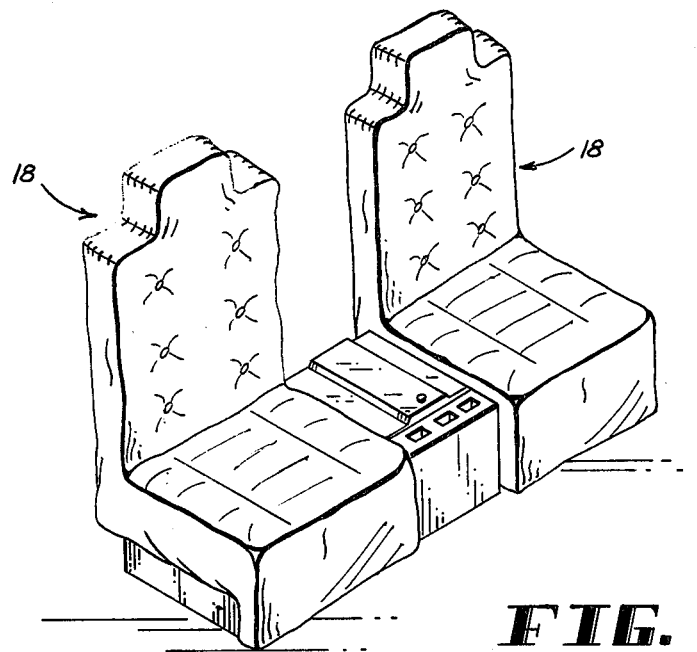
FIG. 1 is a perspective illustrating a pair of front seats of a conventional automobile as converted by the kit of this invention.
Figure 6:
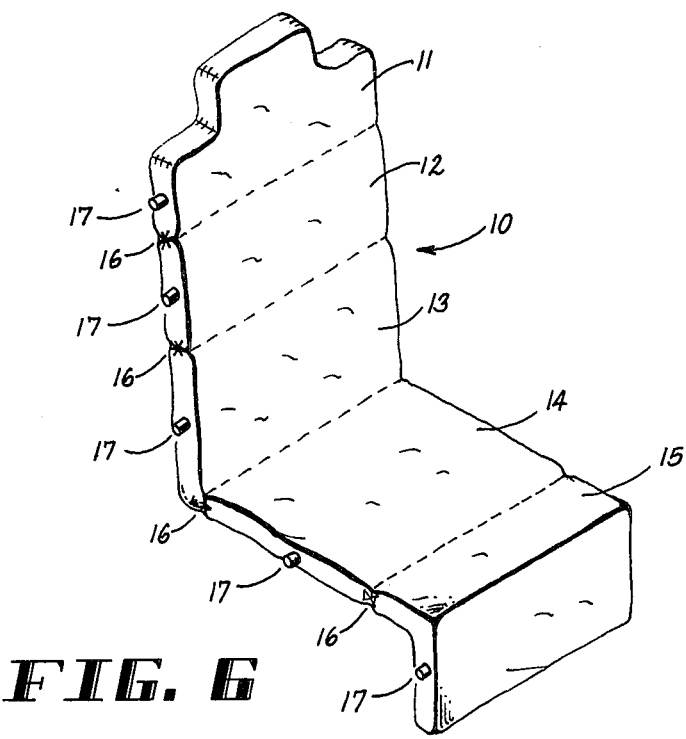
FIG. 6 is a perspective of the air bag assembly and illustrates the air bags in the position which they will assume when applied to one of the car seats of FIG. 1.

While it is entirely practical and possible to provide a kit for a single front seat of an automobile, it is believed that in most instances it would be more desirable to provide a kit for two of the front seats as illustrated in FIG. 1. Such a kit will include as characteristic and essential elements two mattress like assemblies of air bags, one of which is illustrated in FIG. 6 and referred to in its entirety by the reference character 10. While the number of air bags included in assembly 10 is susceptible of variation it is believed that five will be the preferred number. Thus, assembly 10 includes an end bag 11 which is shaped to fit over the upper portion of the back of the front seat and which includes a head rest. Assembly 10 also includes an intermediate back bag 12, a lower back bag 13, a seat bag 14, and a leg engaging bag 15.

These bags are assembled in mattress like formation by stitching represented at 16. Each of the bags 11 – 15 inclusive, is formed with a port not illustrated but from which a nipple 17 extends.

Figure 2:
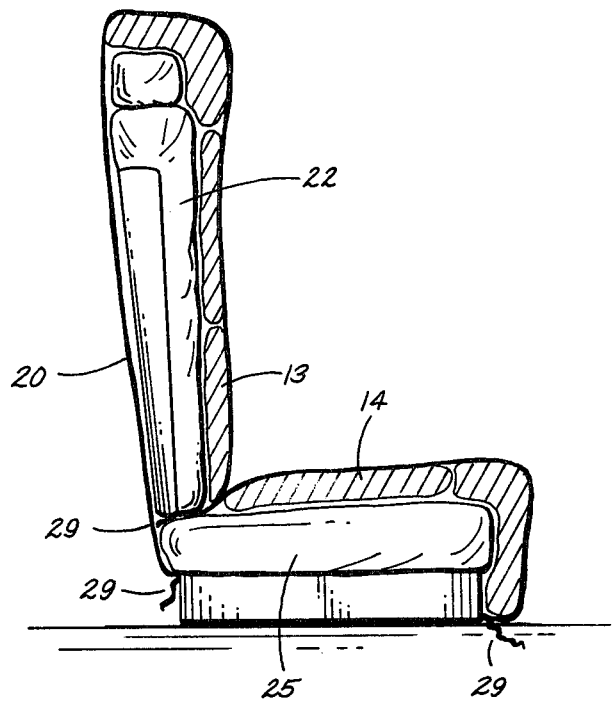
FIG. 2 is a longitudinal vertical section through one of the seats of FIG. 1.
Figure 7:
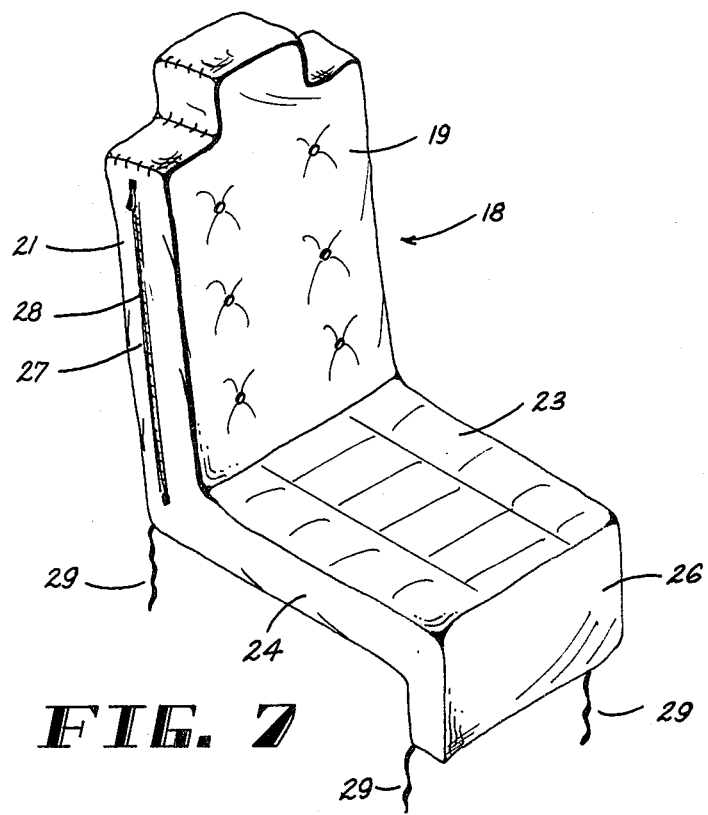
FIG. 7 is a perspective of the slip cover per se, and illustrates the slip cover in the position which it assumes when applied over a seat and air bag assembly.

Referring now more particularly to FIGS. 2 and 7, a slip cover is therein illustrated and designated generally 18. It includes a forward back panel 19, a rear back panel 20, and a pair of side panels 21. Slip covers 18 will be of the material ordinarily employed in the production of seat covers and which will have the property of elasticity to an appreciable degree.

It is important to note the extent of the back panel 20 is subject of some variation depending upon the configuration of the particular seat to which this slip cover 18 is to be applied. As shown in FIG. 2, it extends throughout substantially the complete extent of the back support 22 of the car seat.

Slip cover 18 also includes a horizontal panel 23 from which depend side panels 24. As illustrated in FIG. 1, these side panels 24 have an extent just sufficient to cover the horizontal seat part 25 of the car seat. Slip cover 18 also includes leg panel 26.

One of the side panels 21 is formed with a slit 27 which may be either completely closed or partially closed by a slide fastener 28. Slip cover 18 may also have one or more tie strings 29 attached thereto at the joinder of panels 19 and 23.

With the air bag assembly 10 in position against back support 22 and seat 25 of the car seat, a slip cover 18 is applied thereover in an obvious manner. To facilitate such application, slit 27 may be opened to a required degree and subsequently closed as far as possible to achieve a secure fit.

Referring now more particularly to FIGS. 3 and 4, the selector valve and conduit system for air bags 10 – 15 inclusive will be described. The selector valve is designated in its entirety at 30. It comprises a cylindrical casing 31 and a pair of end plates one of which is indicated at 32. Casing wall 31 is formed with a plurality of ports 33 which correspond in number to the number of air bags to be controlled by the selector valve. As there are two sets with five air bags in each set, there will be ten ports 33 in casing 31. A conduit 34 extends from each port 33 to one of the nipples 17 in the air bags. While these conduits may be rigid, they are preferably flexible to facilitate installation in an automobile.

Extending between the end plates is an axial tube 35 which is rotatable within casing 31 and has a radial tubular extension 37 which communicates between the bore of tube 35 and one of the ports 33. Also communicating with the bore of tube 35 and positioned on the far or remote side of end plate 32 as viewed in FIG. 3, is a conduit 38. There being a swivel connection between conduit 38 and tube 35 as indicated at 36. Conduit 38 extends to a T fitting 39. From one side of T fitting 39 a conduit 40 goes to a motor driven compressor 41 the motor of which is energized by the car battery shown at 42 with an on-off switch 43 being included in the line between battery 42 and compressor 41.

From the practical view point, the motor for compressor 41 will be of very low horsepower and is believed to be entirely practical and possible to plug it into the connection for the cigarette lighter which is included in most cars. This is represented at 44.

Included in the conduit 40 is a one-way check valve 45, the necessity of which will be later described. Extending from T fitting 39 opposite to conduit 40 is a tube 46 which is connected to an exhaust valve designated generally 47. Exhaust valve 47 comprises a casing 48 having a central partition 49 formed with a conically shaped opening providing a valve seat. Tube 46 enters casing 48 above partition 49 and a discharge port 50 is formed in casing 48 below partition 49. A valve 51 is normally seated in the valve seat in partition 49 and is carried by valve stem 52 having an operating knob 53 on its upper free end. An expansion coil spring 54 is interposed between the bottom wall casing 48 and valve 51 and biases the latter to closed position.

Referring now more particularly to FIG. 4, a control panel is designated 55. It displays indicia in the form of the numbers 1 – 10 for the ten air bags to be controlled.

A pointer 56 extends from a knob 57 which is operatively connected to tube 35. Thus, a knob 57 is rotated pointer 56 will indicate the position of the radial extension 37 of tube 35, and thus the particular air bag which communicates with conduit 38. Also positioned on control panel 55 is the operating member for on-off switch 43 and operating member 53.

OPERATION

It will be understood that with the air bag assembly secured in position by slip cover 18 and the latter securely held by tie strings 29 which will pass between the air bags 13 and 14, as shown in FIG. 2, the air pressure in the air bags may be either increased or lowered in the following manner. Knob 57 is rotated so that arrow 56 points to the number for the particular air bag to be affected. If the pressure is to be increased switch 43 is closed to bring compressor 41 into operation and air will be introduced into that particular bag to a required pressure. Air will flow because the check valve 45 permits the flow in that direction. If the bag is to be deflated, operating member 53 is depressed to move valve 51 from its closed position and to permit air to be exhausted through conduit 38, tube 46 and exhaust valve 47. This exhaust will take place only when valve 47 is opened because check valve 45 will not permit air to flow back from conduits 38 and 42 to compressor 41.

MODIFICATION

FIG. 5 illustrates a slight modification of the basic concept as applied to the rear seat of an automobile designated 58. Such seats ordinarily accommodate two people and two of the air bag assemblies 10 will be placed over the rear seat in the obvious manner. However rather than employing two slip covers 18 a single slip cover 59 is provided. This slip cover 59 will have a top edge panel 60 which is tucked within the back of the rear seat and secured thereto in any appropriate manner such as by snap fasteners, tacks, or any conventional holding devices. Tie strings similar to those shown at 29 may also be used.

While preferred specific embodiments of the invention are herein disclosed it is to be clearly understood that the invention is not limited to the exact constructions, materials, and devices illustrated and described because various modifications of these details may be provided in putting the invention into practice.

What is claimed is:

1. A seat kit making an underlying seating assembly a full length body support adjustable to the comfort, shape and size of a particular occupant, said seat kit including a head, back, seat, knee and leg supporting portion, said kit including;
    (a) an assembly of inflatable bags joined successively together in a mattress like formation and including at least 3 bags to position the head and back and at least 2 bags to position the butt knee and legs on said seat, one of said last two bags positioning the knee and legs and forming an inverted L shape positioned over the top and extending down the entire front of said underlying seating assembly to thus effectively increase the length of the seat and support the knee
    (b) a port in each of said inflatable bags,
    (c) a coupling member on each bag for the port therein,
    (d) a seat cover dimensioned to fit and hold over said seating assembly the bag assembly positioned there on, and including forward and rear back panels, side panels, a horizontal seat panel and a front leg panel for maintaining the assembled relation of seat and bag assembly,
    (e) a source of fluid under pressure,
    (f) a control panel with a selector valve directing the fluid to and from the inflatable bags of one or more seats — and two buttons, one activating the inlet valve and/or fluid source, and one activating the outlet valve,
    (h) an exhaust valve, and
    (i) a conduit system for connecting said source of fluid such as air, to said selector valve, and said exhaust valve to said selector valve, said conduit system including means for closing said exhaust valve when said source of pressure is operatively connected to said selector valve, and means for cutting off said source of fluid under pressure from effective communication with said selector valve when exhaust valve is open.

2. The kit of claim 1 in which one of the side panels of said seat cover is formed with a slit together with a closure for varying the extent to which said slit is open.

3. The kit of claim 1 together with a second assembly of inflatable bags for application to a second front seat of said automobile, a second slip cover securing said second set of inflatable bags in position on said second automobile seat, and in which the selector valve is connected to the inflatable bags of said second assembly by a plurality of tubes.

4. The seat kit of claim 1 wherein said control panel has a selector valve having a plurality of ports corresponding in number to the number of inflatable bags controlled by this panel, the selector valve having a casing, a rotatating bore mounted in said casing, and having a source of fluid connected to said conduit system, a rotating operating member with an axial tube and side bore to be aligned with a port selected, and two buttons placed on the panel, one activating the inlet valve or fluid source, one activating the outlet valve.

\* \* \* \* \*